(12) United States Patent
Dobbins et al.

(10) Patent No.: US 8,905,579 B2
(45) Date of Patent: Dec. 9, 2014

(54) VENDING MACHINE HAVING LED LAMP WITH CONTROL AND COMMUNICATION CIRCUITS

(75) Inventors: Bob M. Dobbins, Villanova, PA (US); Louis J. Frontino, Cherry Hill, NJ (US); Philip R. Reger, New Providence, PA (US); Paul L. Mason, Inwood, WV (US)

(73) Assignee: Ellenby Technologies, Inc., Woodbury Heights, NJ (US)

(*) Notice: Subject to any disclaimer, the term of this patent is extended or adjusted under 35 U.S.C. 154(b) by 729 days.

(21) Appl. No.: 11/552,307

(22) Filed: Oct. 24, 2006

(65) Prior Publication Data
US 2008/0094837 A1 Apr. 24, 2008

(51) Int. Cl.
| | |
|---|---|
| G05F 1/00 | (2006.01) |
| F21K 99/00 | (2010.01) |
| H05B 33/08 | (2006.01) |
| G07F 9/02 | (2006.01) |
| G07F 9/10 | (2006.01) |
| F21Y 101/02 | (2006.01) |
| F21Y 103/00 | (2006.01) |

(52) U.S. Cl.
CPC ... *F21K 9/00* (2013.01); *F21K 9/17* (2013.01); *H05B 33/083* (2013.01); *G07F 9/023* (2013.01); *G07F 9/10* (2013.01); *F21Y 2101/02* (2013.01); *F21Y 2103/003* (2013.01); *Y02B 20/386* (2013.01)
USPC ............ 362/249.02; 362/249.06; 362/249.13; 362/285; 362/418; 362/427

(58) Field of Classification Search
USPC ......... 362/229, 231, 238, 240, 249, 251, 250, 362/285, 287, 418, 427, 295, 394, 89, 92, 362/234, 219, 220, 217.12, 217.16
See application file for complete search history.

(56) References Cited

U.S. PATENT DOCUMENTS

| | | | | |
|---|---|---|---|---|
| 4,354,613 | A | * | 10/1982 | Desai et al. ........................ 377/1 |
| 4,513,439 | A | * | 4/1985 | Gorgone et al. ............... 382/135 |
| 4,783,747 | A | * | 11/1988 | Komori et al. ................ 700/244 |
| 5,099,401 | A | * | 3/1992 | Kondo et al. .................. 362/541 |
| 5,357,170 | A | * | 10/1994 | Luchaco et al. .............. 315/159 |
| 5,420,482 | A | * | 5/1995 | Phares ........................... 315/292 |
| 5,464,087 | A | * | 11/1995 | Bounds et al. ................. 194/200 |
| 6,016,038 | A | * | 1/2000 | Mueller et al. ................ 315/291 |
| 6,211,626 | B1 | * | 4/2001 | Lys et al. ....................... 315/291 |
| 6,435,691 | B1 | * | 8/2002 | Macey et al. .................. 362/101 |

(Continued)

FOREIGN PATENT DOCUMENTS

| | | | | |
|---|---|---|---|---|
| JP | | 2004303614 A | * 10/2004 | |
| WO | WO 2007045099 A1 | * | 4/2007 | ............ G06F 13/362 |

OTHER PUBLICATIONS

English Abstract of Japanese Publication JP 2004303614 A.*

*Primary Examiner* — Ismael Negron
(74) *Attorney, Agent, or Firm* — Law Offices of Peter H. Priest, PLLC

(57) ABSTRACT

A vending machine includes a controller with an interface to control vending machine peripherals including an integrated LED lamp assembly having a plurality of light emitting diodes (LEDs) and a DC power connector to connect to a source of DC power within the vending machine. A power regulating circuit adjustably controls the amount of power provided to the LEDs in response to vending machine standard control signals received from the vending machine via a communication circuit compatible with the vending machine controller interface.

16 Claims, 20 Drawing Sheets

(56) References Cited

U.S. PATENT DOCUMENTS

| | | | |
|---|---|---|---|
| 6,608,453 B2* | 8/2003 | Morgan et al. | 315/312 |
| 6,726,348 B2* | 4/2004 | Gloisten | 362/372 |
| 6,816,083 B2* | 11/2004 | Brandt | 340/870.11 |
| 6,867,757 B1* | 3/2005 | Nakamura | 345/83 |
| 6,882,111 B2* | 4/2005 | Kan et al. | 315/122 |
| 6,888,322 B2* | 5/2005 | Dowling et al. | 315/292 |
| 7,038,398 B1* | 5/2006 | Lys et al. | 315/291 |
| 7,119,503 B2* | 10/2006 | Kemper | 315/309 |
| 7,178,941 B2* | 2/2007 | Roberge et al. | 362/225 |
| 7,311,423 B2* | 12/2007 | Frecska et al. | 362/372 |
| 7,352,339 B2* | 4/2008 | Morgan et al. | 345/31 |
| 2002/0060526 A1* | 5/2002 | Timmermans et al. | 315/246 |
| 2005/0252925 A1* | 11/2005 | Kelly | 221/92 |
| 2007/0070615 A1* | 3/2007 | Joslin et al. | 362/92 |
| 2009/0012646 A1* | 1/2009 | Tanaka et al. | 700/241 |
| 2011/0194278 A1* | 8/2011 | Yang et al. | 362/217.12 |

* cited by examiner

| Color LED | Wavelength | Current | Voltage | Optical Efficiency | Manufacturer |
|---|---|---|---|---|---|
| Red | 625 nm | 140 mA | 2.1 V | 50 lm/W | Osram LRG6SP |
| Green | 528 nm | 140 mA | 3.6 V | 37 lm/W | Osram LTG6SP |
| Blue | 470 nm | 140 mA | 3.6 V | 10 lm/W | Osram LBG6SP |
| Amber | 617 nm | 140 mA | 2.1 V | 62 lm/W | Osram LAG6SP |

FIG.8

VENDING MACHINE HAVING LED LAMP WITH CONTROL AND COMMUNICATION CIRCUITS

FIELD OF THE INVENTION

The present invention relates to providing an efficient, long life alternative to conventional light sources that provides added value control capabilities. More specifically, the present invention can be used as a fluorescent lamp alternative in a vending machine to reduce energy use, improve safety, extend life, and allow attention getting use of the machine lighting. Additionally, by adding intelligence (in the form of a control circuit) to the light source, the machine controller can accommodate specific energy and lighting needs through simple control interfaces.

BACKGROUND OF THE INVENTION

The current trends toward increased efficiency, environmental friendliness, and higher quality longer life products makes the transition to LED based lighting more and more prevalent. The use of LED lighting in automobile lights, traffic lights, and even incandescent light replacements is a growing trend. There are a number of reasons the use of LED lights has not been used as an alternative to fluorescent lamps including the inherent efficiency of fluorescent lamps. Typically, fluorescent lamps have a life of about 6000 hours. The LED replacement lamps would have a life of 30,000 to 50,000 hours. During the life of LEDs the output can be held constant avoiding the degradation in light and flickering seen in fluorescent lamps. Additionally, fluorescent lamps provide a soft uniform light which is particularly advantageous in applications such as vending machines. The use of incandescent or even LED lights are generally not used in vending machines as having consumers look into these light sources is uncomfortable and tends to be blinding, which would make viewing the products to be vended more difficult. Looking into fluorescent lights does not generally have this effect, and hence improves the viewing of products. The present invention allows the use of LEDs while maintaining the advantages of fluorescent lighting. The present invention also takes advantage of the directional characteristics of LEDs to provide more useful light output where it is needed further improving the efficiency of the system.

The use of the present invention as a replacement for fluorescent lamps has a number of additional advantages. The current EU RoHS Directive banning the use of environmentally problematic materials currently provides an exception for fluorescent lamps. Without the exception, these lamps would not meet the requirements due to the levels of mercury used in the manufacturing and required for the operation of these lamps. Therefore, the present invention provides an environmentally safe alternative to the conventional lighting used in many applications, and in particular vending machines.

The use of the present invention as a replacement for fluorescent lamps also addresses the increasing concern of safety and efficiency. In an effort to improve the power efficiency of fluorescent lamps, the industry has moved from conventional ballasts to electronic ballasts. Each of these has presented challenges and problems which still exist and are particularly notable in applications serviced by untrained personnel such as in vending machines. The conventional ballasts are inefficient. Electronic ballast are more efficient but considerably more expensive. However, they have been associated with a number of quality problems. These range from the annoying flashing of fluorescent lamps as they age and cannot correctly power on, to arcing at the lamp sockets especially when lamps are not correctly inserted resulting in the potential for fire. LED based lamps would eliminate these issues. Another key advantage of the lamp of the current invention as a replacement for fluorescent lamps is the LED lamps will not present a safety concern if dropped or broken. Fluorescent lamps implode when broken, shattering glass and the environmentally unfriendly elements housed within the lamps. LED lamps are based on solid state devices that have no such concern.

A key element to the current invention is that the LED based lamp can include additional electronics to allow these lamps to be mechanically and electrically compatible with existing fluorescent lamps. In these cases, the LED based lamps can be direct replacements for existing fluorescent lamps in applications such as current vending machines. This would allow most of the benefits of using the LED lamps to be realized without having to re-wire existing lighting systems or replacing existing ballasts. In most applications light is desired to be directed to an area limited to about 180 degrees or less. Standard fluorescent lamps emit light in 360 degrees which results in wasted energy or the requirement for reflectors to direct the light where needed. The current invention will direct light in a plane limited to about 180 degrees. To optimize the orientation of the LED lamp, adjustable pins used to secure the lamps into existing lamp sockets will allow the necessary flexibility to direct the light where needed.

The current invention also anticipates the ability to control the lighting rather than just have it on continuously and at full brightness. This is achieved by adding intelligence to the LED lamp so that it has a communications capability compatible with existing communication systems within the product or system with which the LED lamp is intended to be used. In the case of vending machines, this communications system can be MDB, RS232, DEX, infrared, inductive, RF, or the like. The advantages of providing such an intelligent lamp would be to allow the existing controller, such as the existing vending machine controller, to control the operation of the machine lighting through the existing communication links. This would allow the lamp to be turned on or off based on time, machine use, sensed approaching of consumers, or any such method. It would also allow the lamp to be dimmed, flashed, chased or any other special effects created as needed. One particular implementation of the current invention uses multiple color LEDs to allow the creation of different colored light to be generated also controllable through the communications link. The particular choice of Red, Green and Blue LEDs has the additional benefit of creating white light of selectable color temperature as well as the various colors achievable with the mixing of these primary colors. The use of color provides additional attention getting techniques to be applied which will aid in the marketing of the products that may be in a vending machine as an example.

In the case of a vending machine, the choice of MDB as a communications link is particularly attractive as this is the existing interface standard for all the peripherals in a vending machine. This includes the coin, bill and card readers. The protocol already exists and is supported through NAMA, the industry trade association. Adding specific enhancements to this interface to allow vending controllers to have the ability to achieve the control and leverage the features of the LED lamp would be a relatively simple process. The interface is not proprietary so any machine manufacturer would be able to take advantage of this new technology.

In the broader context, the control of the intelligent LED lamp can include a wireless interface such as RF, IR or the like. The use of wireless remote control opens the market options of providing efficient lighting to any environment so long as a source of power (low voltage or high voltage, AC or DC) is available. All the advantages of efficient control of the lighting (time based turn on and off, use based turn on or off, dimming and color generation) are achievable without having to rewire an existing facility or device.

The mechanical configuration of the LED lamp of the current invention is not limited to just the fluorescent tube arrangement. However, even for this arrangement, the LED lamps can be provided in fixed length "strips" which can be interconnected to provide various length lamps. For example, a 12" lamp could be connected directly to a second 12" lamp to provide a 24" lamp. This stackable design would allow maximum flexibility using standard lamp modules.

SUMMARY OF THE INVENTION

The present invention is intended to provide an LED based replacement for fluorescent lamps, providing diffused light, and operable with existing fluorescent lamp ballasts and directly compatible with existing lamp sockets, or without such preexisting connections and power supplies, as a full replacement for other types of light sources. The lamp assembly of the present invention operates with high energy efficiency on low voltage and includes a control circuit having communications link, as well as remote and wireless control. The lamp assembly of the present invention is dimmable, has built in flashing and sequencing ability as well as control of the color of the light produced. In order to accommodate many installation options, the assembly of the present invention provides a mechanically interconnecting LED based lamp to allow multiple length lamps to be created from a standard smaller size unit. Other features and advantages of the present invention are described further below and will be readily apparent by reference to the following detailed description and accompanying drawings.

DETAILED DESCRIPTION OF THE INVENTION

Figure 1:
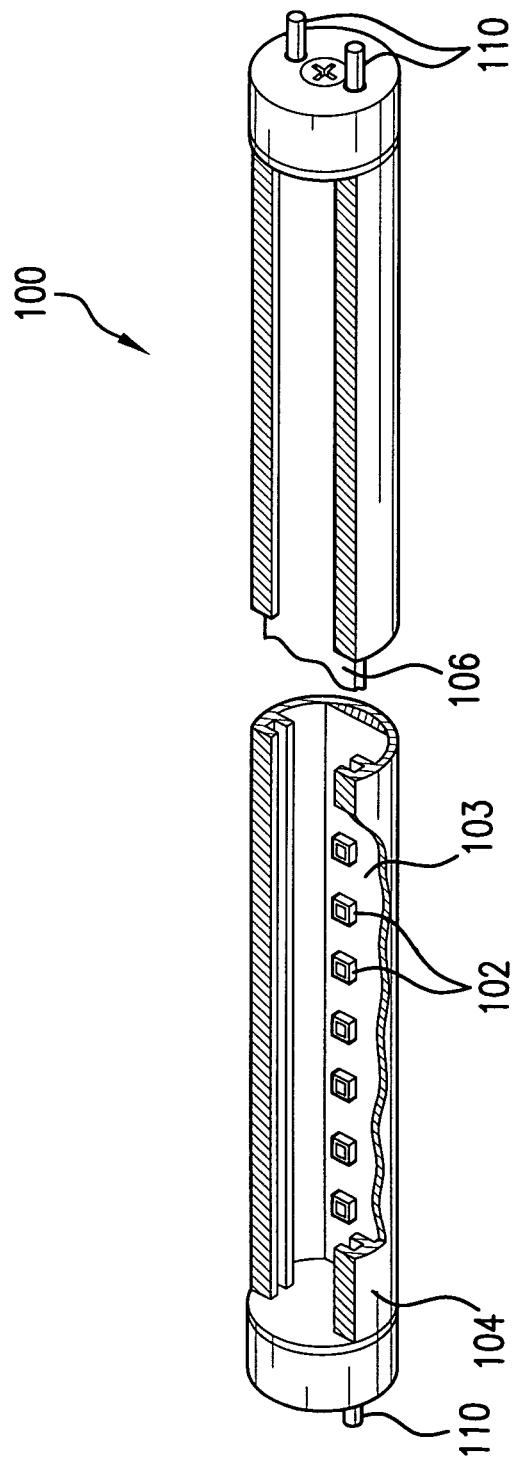
FIG. 1 depicts a perspective view of a presently preferred embodiment of a LED based lamp suitable as a replacement fluorescent lamp in accordance with the present invention.
Figure 2:
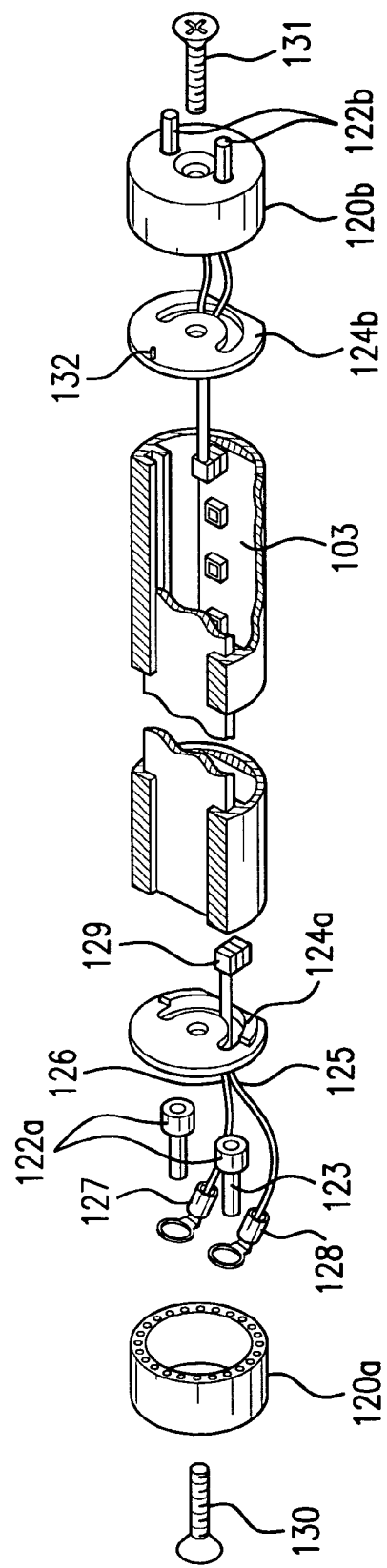
FIG. 2 depicts an exploded view of a preferred configuration of the mounting pins to allow adjustability when mounting in existing lamp sockets.

Referring to FIG. 1, a perspective view, 100, of a presently preferred embodiment of the current invention is shown. An array of white LEDs, 102, are mounted to a printed circuit board, 103, that is then mounted to a metal extrusion, 104. A natural translucent white polystyrene lens, 106, is used to cover the LEDs and act as a diffusing lens. The assembly is terminated on both sides with pin terminals, 110, suitable to mount into standard fluorescent sockets. This allows standard fluorescent bulbs to be replaced by the LED lamp designed for this purpose and described in detail below. The terminals at the end of each of ends of the fluorescent lamp replacement assembly can be adjusted so the orientation of the lamp in the sockets is adjustable. This is best shown in FIG. 2. By positioning the end terminals 122a and 122b of the LED lamp, the light output from the lamp can be directed in any position in increments determined by the positioning wheel, 120a and 120b, from the standard mounting position. In a preferred embodiment of the fluorescent lamp mounting arrangement, the end terminals, 122a and 122b, are screw machined parts with threads, 123, which screw into the positioning wheels, 120a and 120b. The wires, 125,126 which are used to connect the end terminals, 122a and 122b, to the circuit board, 103, are terminated with ring terminals, 127 and 128, at one end and a connector, 129, at the other end. The connector, 129, will plug into its mate on the printed circuit board, 103. The terminal assembly is keyed to the mounting plates, 124a and 124b by pins shown in mounting plate 124b at 132 and then fastened by screws, 130 and 131. In a similar manner, other standard fluorescent lamp sizes and terminations can be emulated to allow the lamp of the current invention to be used as a replacement for most fluorescent lamp styles.

Figure 3:
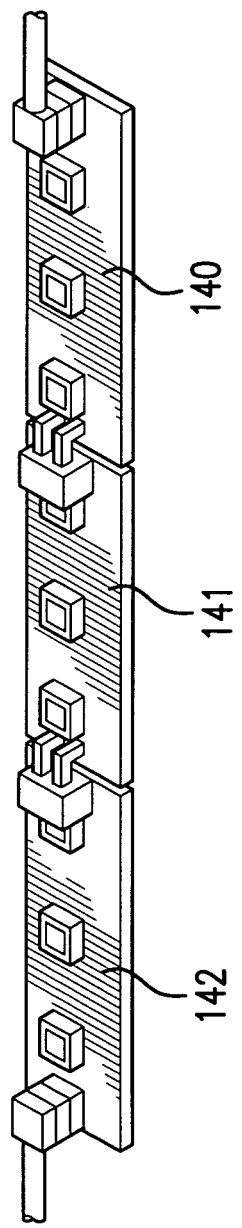
FIG. 3 depicts an arrangement of fixed length LED lamp strips suitable to be interconnected to create lamps of increased length.

An alternate assembly approach of the current invention is shown in FIG. 3. In this arrangement, individual strings of LEDs or arrays of LEDs are mounted on a single printed circuit board as shown. Groups of these circuit boards can be interconnected to allow larger lamps to be created from a group of LED arrays, 140, 141 and 142, such as the arrays of LEDs of FIG. 6, for example. Details related to the strings of LEDs and arrays of LEDs will be discussed below. These connectors are positioned so that a second LED assembly can be interconnected to the first making an assembly twice as long. Additional assemblies can be interconnected to provide increasing lengths of LED assemblies. This is particularly useful to allow replacement LED lamps to be designed with standard LED assemblies to produce 18", 24 ", 32" and other longer fluorescent bulb equivalents as well as in new design applications which are not bound by having to mount in standard fluorescent tube sockets, as in designing the LED lamp into equipment using a low voltage interface such as the MDB interface used in vending machines. This will be discussed in greater detail below.

Figure 4:
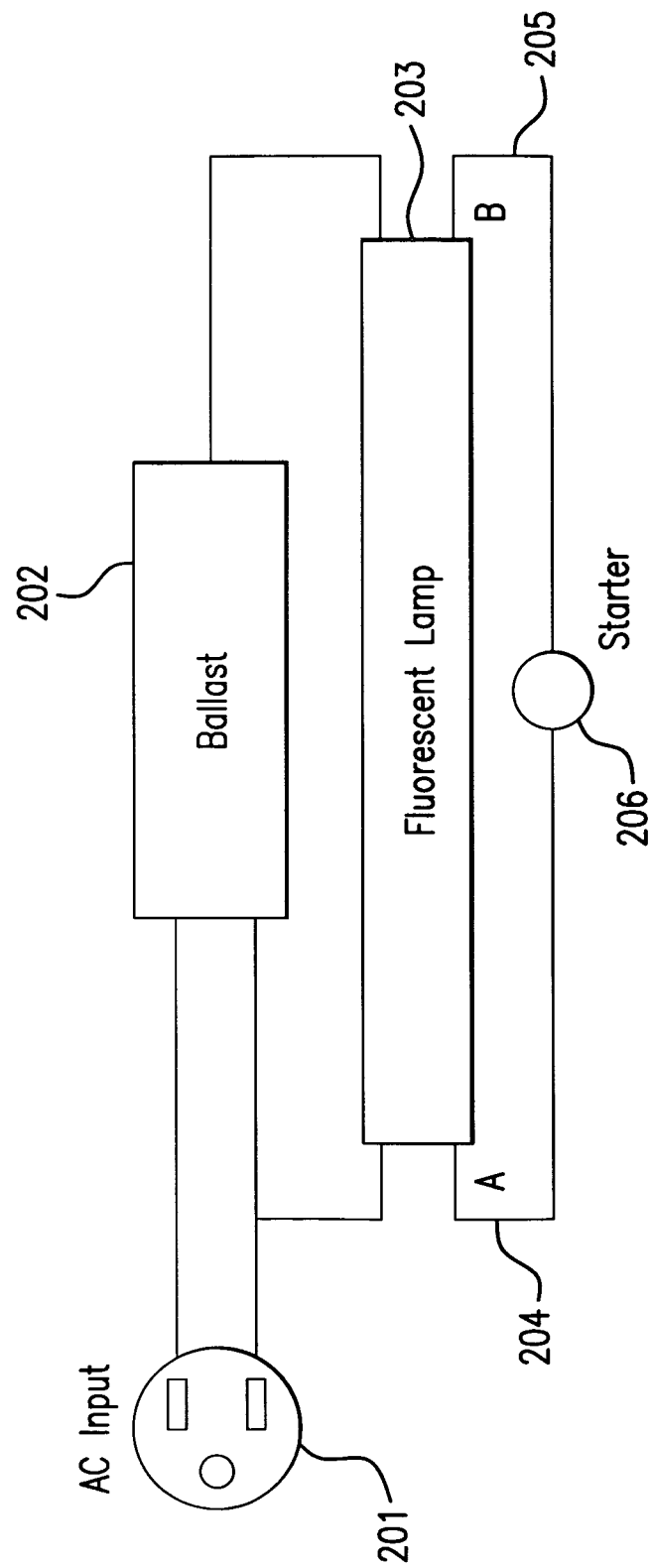
FIG. 4 depicts a block diagram of a standard fluorescent ballast and lamp wiring arrangement.

Referring to FIG. 4, a typical standard fluorescent ballast and fluorescent lamp block diagram is shown. Fluorescent lamps use a ballast to limit the voltage and current to the lamp once the lamp is on. Initially, the ballast provides filament current to start the lamp along with the use of a starter 206. The starter 206 effectively shorts the lamp until the filaments are powered and a supply of electrons is generated, at which time the starter 206 becomes an open circuit allowing the electrons to flow through the fluorescent tube. The electrons bombard the fluorescent material coating the lamp turning on the light. The details of operation of a fluorescent lamp are well understood and are only presented in summary form for reference. Other ballast arrangements are also used and will not be discussed here as these are well known in the art. This typical arrangement is shown for illustrative purposes.

Typically, an 18 watt fluorescent lamp 203 would use a flourescent ballast 202 sourcing about 0.3 amps of current and having an inductance of approximately 0.5 Henries. This ballast limits the voltage to the fluorescent lamp to approximately 60 volts when the lamp is "on" as its reactance is approximately 200 ohms at 60 Hz. When the lamp is in the starting mode, the full line voltage of 120 volts 201 appears across the lamp, and, a starter device energizes the filaments at both ends of the lamp to ionize the gas within the lamp. As the filaments ignite the gases in the lamp, the rapid excitation of the gas causes the lamp to turn on while acting as negative impedance. The ballast now limits the voltage due to the inductive reactance of the ballast. An example of such a ballast is the Advance Transformer Company catalogue number LC-14-20C-20W.

Figure 5:
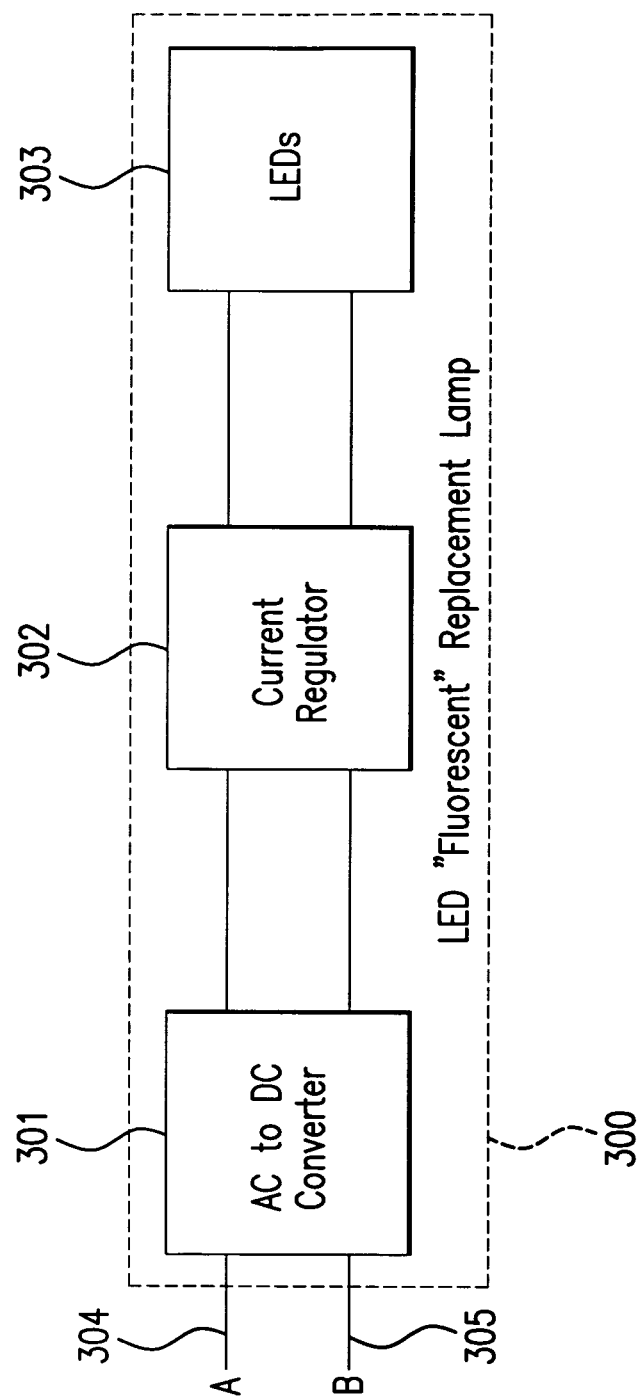
FIG. 5 depicts a block diagram of the control circuit electronics associated with the LED based lamp to be used as a replacement for fluorescent lamps in accordance with the present invention.

A preferred mode of the current invention is an LED based device that would be able to be fitted into a standard Fluorescent lamp socket. When using the LED lamp of the present invention, the starter 206 is removed from the fluorescent fixture. The LED "fluorescent" lamp replacement as shown in FIG. 5, in one embodiment would be mechanically compatible with a 24" tube such as the F18T8/CW/K24 fluorescent lamp. This control circuit consists in its simplest form, of an AC to DC Converter 301 or Bridge Rectifier, and a group of LEDs 303 connected in a series and/or parallel combination, depending upon the light output (power) desired. Further discussion on how these combinations are matched to the desired functionality of the replaced Fluorescent Lamp follows below. In order to have complete control over the light output of the LED replacement lamps, a current regulator circuit 302 can be added to the control circuit of the current invention to ensure the required current is determined by the lamp eliminating variations between ballasts. The current regulator circuit may be limited to a simple voltage limit to limit the maximum current drawn by the LED devices in the LED lamp. This will be discussed below in detail.

Figure 6:
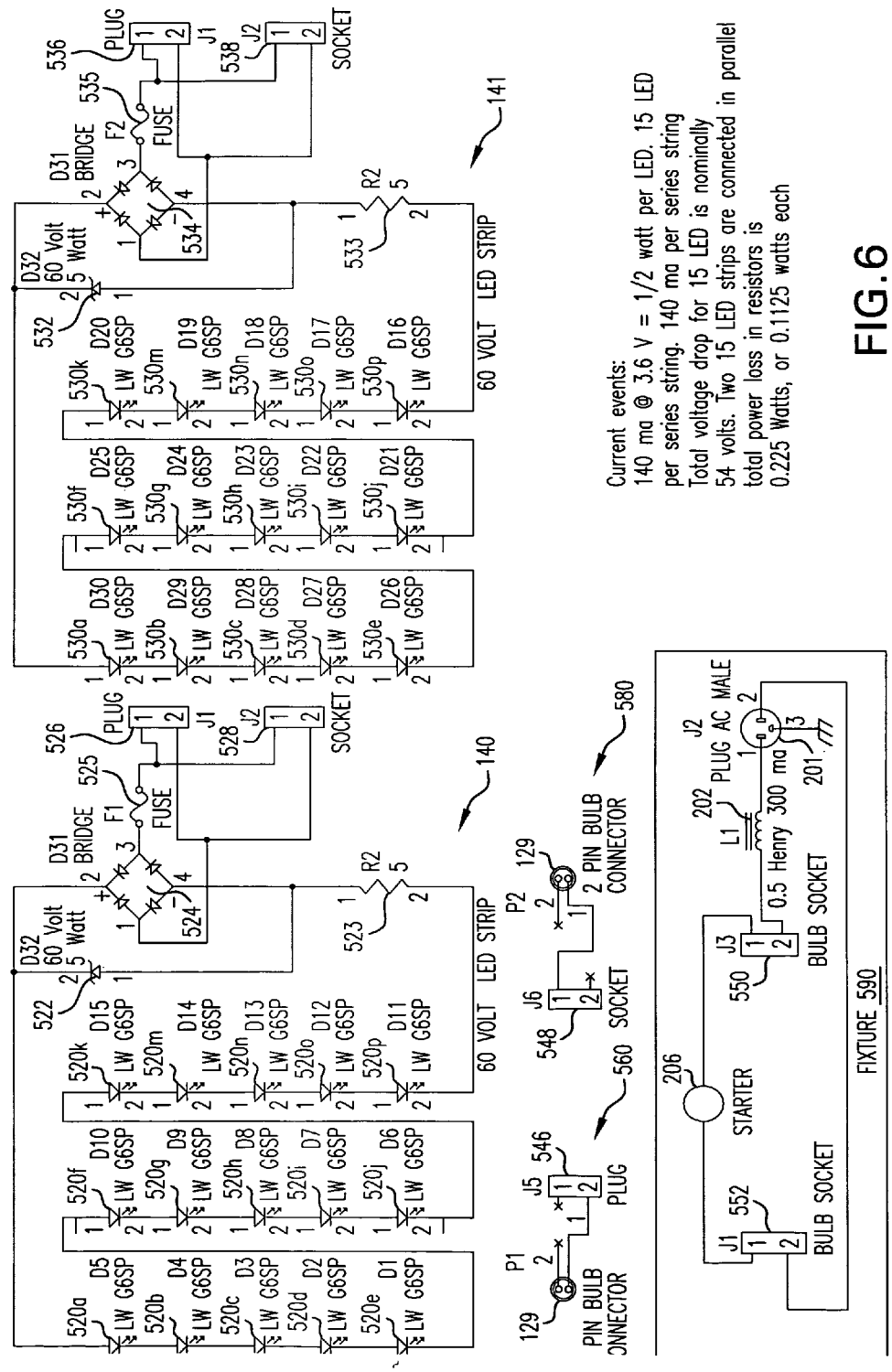
FIG. 6 depicts an electronics schematic for a preferred embodiment of the LED based lamp to be used as a replacement for fluorescent lamps in accordance with the present invention

A more detailed look at a preferred embodiment of the present invention is shown in FIG. 6. Referring to the lamp fixture 590, the existing fluorescent ballast 202 receives line voltage power 201 from a standard 120 VAC power source (US standards are used in this preferred embodiment). The output of the ballast 202 and 120 VAC power source 201 is supplied to the fluorescent lamp sockets 550 and 552. For the ballast type shown, a starter 206 is used as described above and is shown terminating at the second terminal pins at each fluorescent sockets 550 and 552. The present invention interfaces with the ballast 202 and power source 201 through the existing lamp sockets 550 and 552. The output of the ballast 202 and power source 201 is an AC signal as discussed above. FIG. 6 includes a schematic representation of two LED lamp assemblies, 140, 141 as earlier described in FIG. 3. A full wave diode bridge, 524 and 534 is used in each of these LED lamp assemblies to convert the AC signal to a DC signal to source the array of LEDs denoted by 520*a-p* and 530*a-p* for each of the two LED assemblies shown. The use of a full wave bridge for this application is well known in the art and is not explained further. A current balancing resistor 523 and 533 is in series with the diode bridges 524 and 534 respectively to balance the current to be supplied to each of the LED arrays. As seen, voltage limiter 522 and 532 limits the voltage to 60 volts using standard zener diodes as shown. The current supplied by the power source 201 and ballast 202 combination is determined by the ballast 202 which acts as a current limiting inductor of 0.5 Henry. At the line frequency of 60 Hz, the current capability of the ballast in the example of FIG. 6 is about 300 mA. Since this current supplies two LED arrays 140 and 141, each of these have about 150 mA of current available. The voltage limiters 522, 532 shown are 60 volt 5 watt zener diodes. These zener diodes assure the voltage across the array of LEDs does not exceed their voltage specifications. The typical voltage drop of white LEDs are 3.6V as shown in the chart in FIG. 8. The fifteen LEDs shown in each LED assembly 140 and 141 will therefore drop 15×3.6V or 54 Volts. The voltage source of the ballast 202 and power source 201 supply will be able to support this voltage as the inductor (ballast 202) will absorb the excess voltage available. The use of inductors and ballasts for current limiting is well known in the art and not further discussed here.

The array of LEDs are shown in the preferred embodiment as two parallel combinations of 15 LEDs, 140 and 141, each parallel combination having current balancing resistors 523 and 533 to ensure the current through each of the parallel combinations of LEDs is approximately equal. Without these resistors, the current would divide based on the impedances differences of the arrays of LEDs which can be quite variable. The series combinations of LEDs are shown as 520*a* through 520*p* and 530*a* through 530*p*. Each of the LEDs in the preferred embodiment is ½ watt rated and drop about 3.6 volts. The two parallel combinations of LEDs are shown drawing about 150 mA of current each.

As described above in reference to FIG. 3, the LED arrays can be partitioned into individual assemblies to be interconnected to allow a family of products of varying lengths to be easily made. The two LED arrays of FIG. 6, 140 and 141 each have their own diode bridge, 524 and 534, as well as their own voltage limiters 522 and 532, optional fuses, 525 and 535 as well as male and female connectors 526, 528, 536, 538 to allow for this interconnection. The lamp sockets, 129 in both are shown connected to a male connector, 546 in 560. This male connector 546 would interconnect to one of the female connectors 528 or 538 of the LED arrays. If the female connector 528 were used, the male connector from this LED array would be interconnected to the female connector 538 of the second LED array. The male connector 536 of this second LED array can then be interconnected to a third LED array, not shown, or to the socket 548 of assembly 580 which then interconnects to the other end lamp connector 129.

Figure 7:
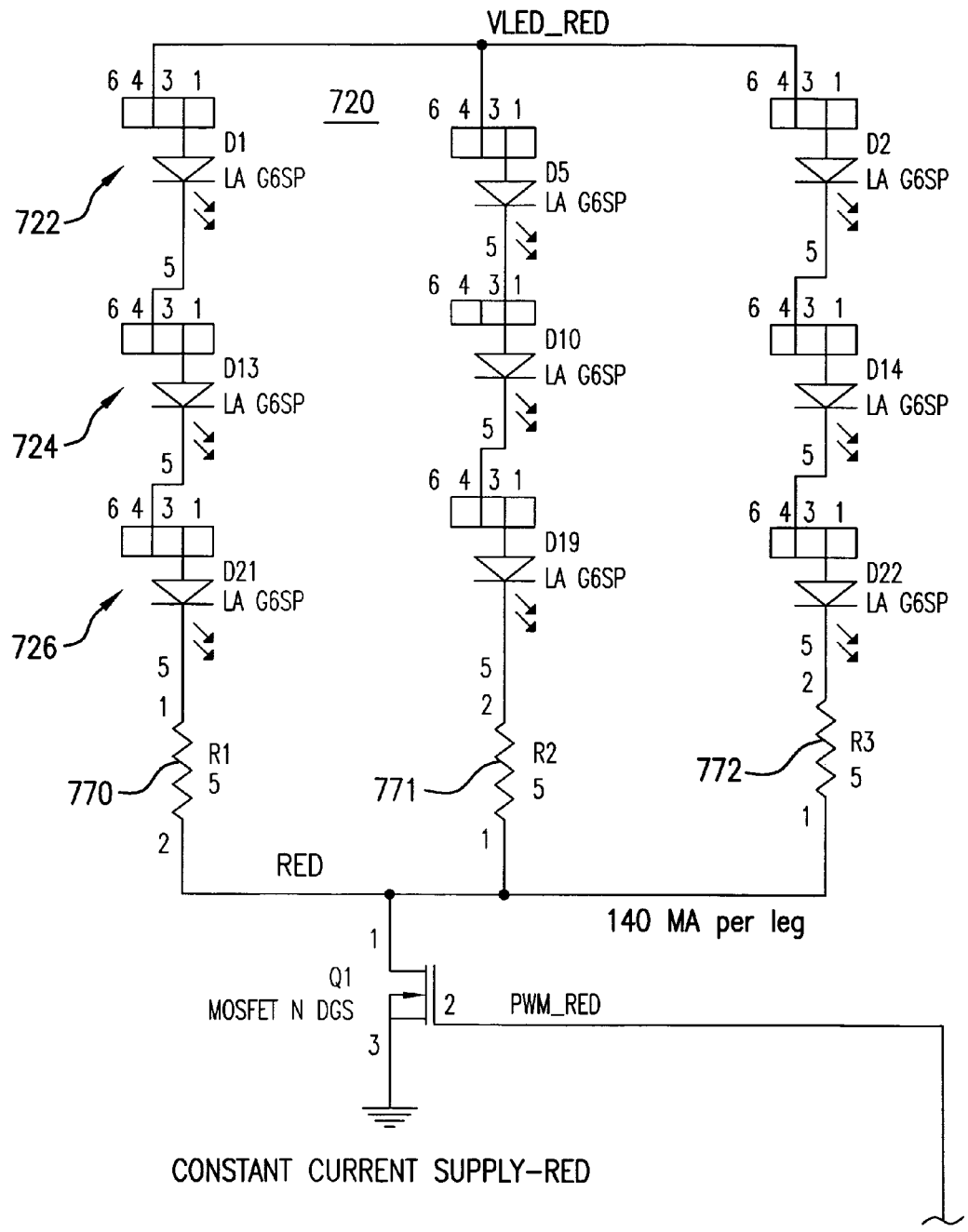
FIG. 7 depicts an electronic schematic for a preferred embodiment of the LED based lamp with color control.
Figures 1, 7:
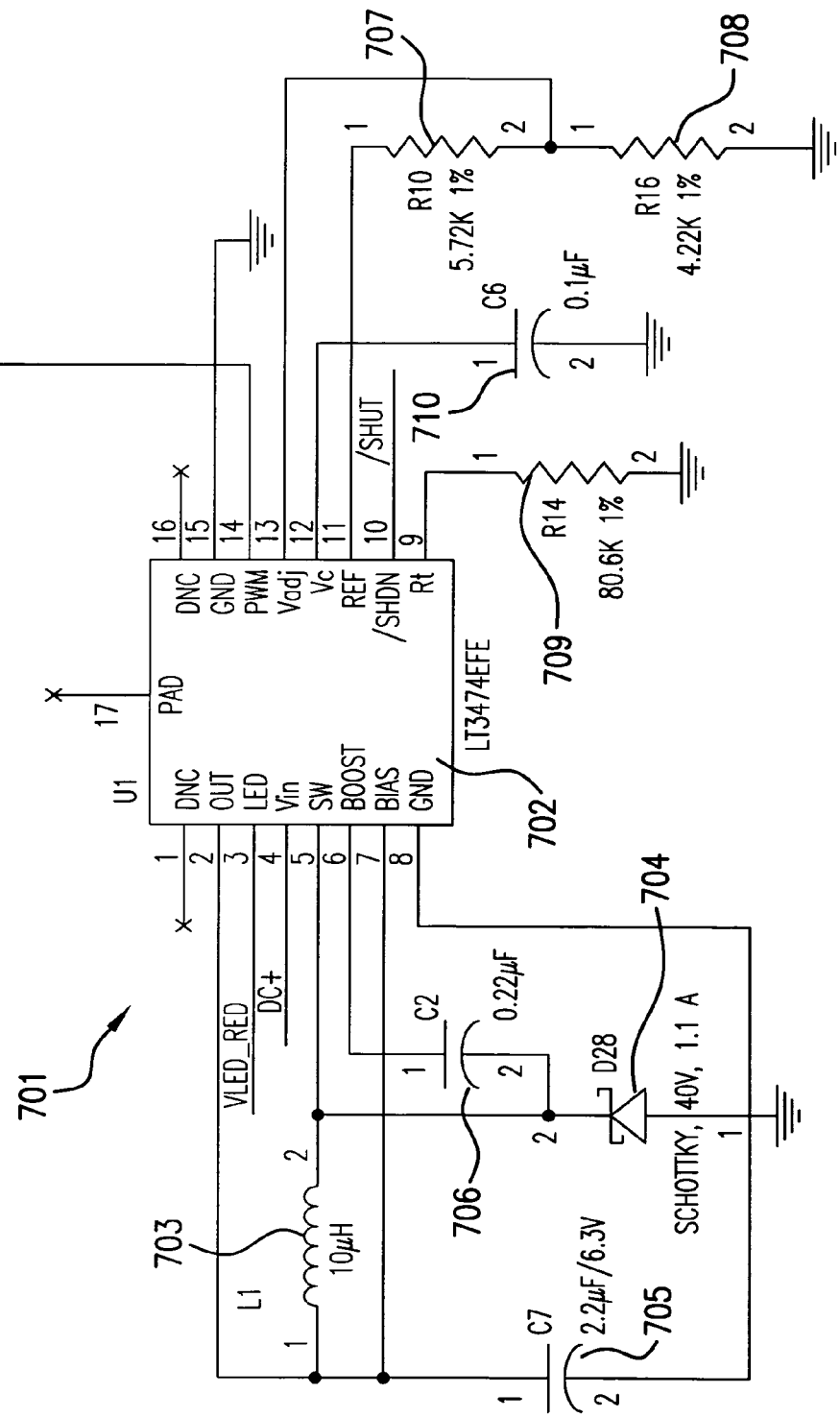
Figures 2, 7:
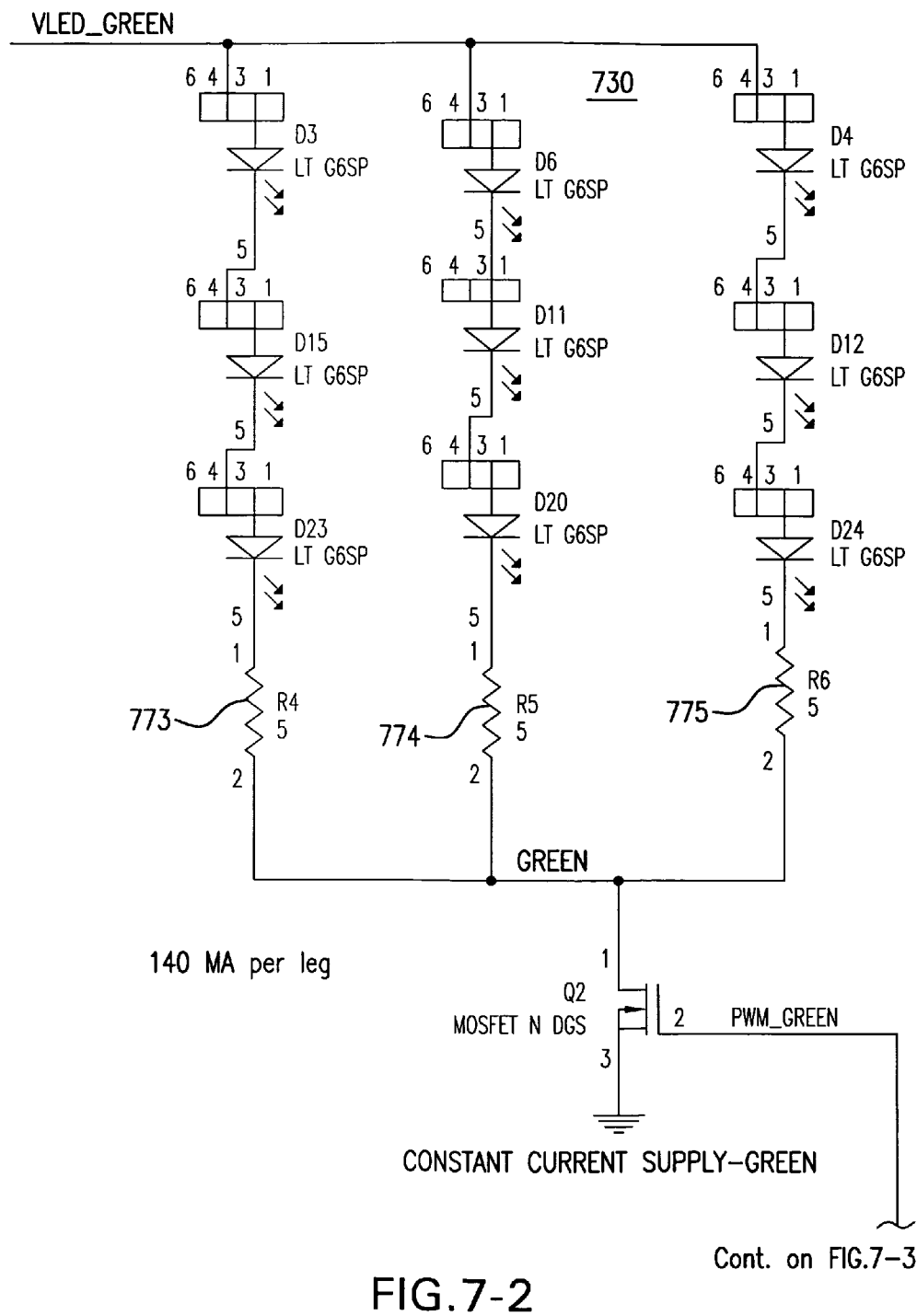
Figures 3, 7:
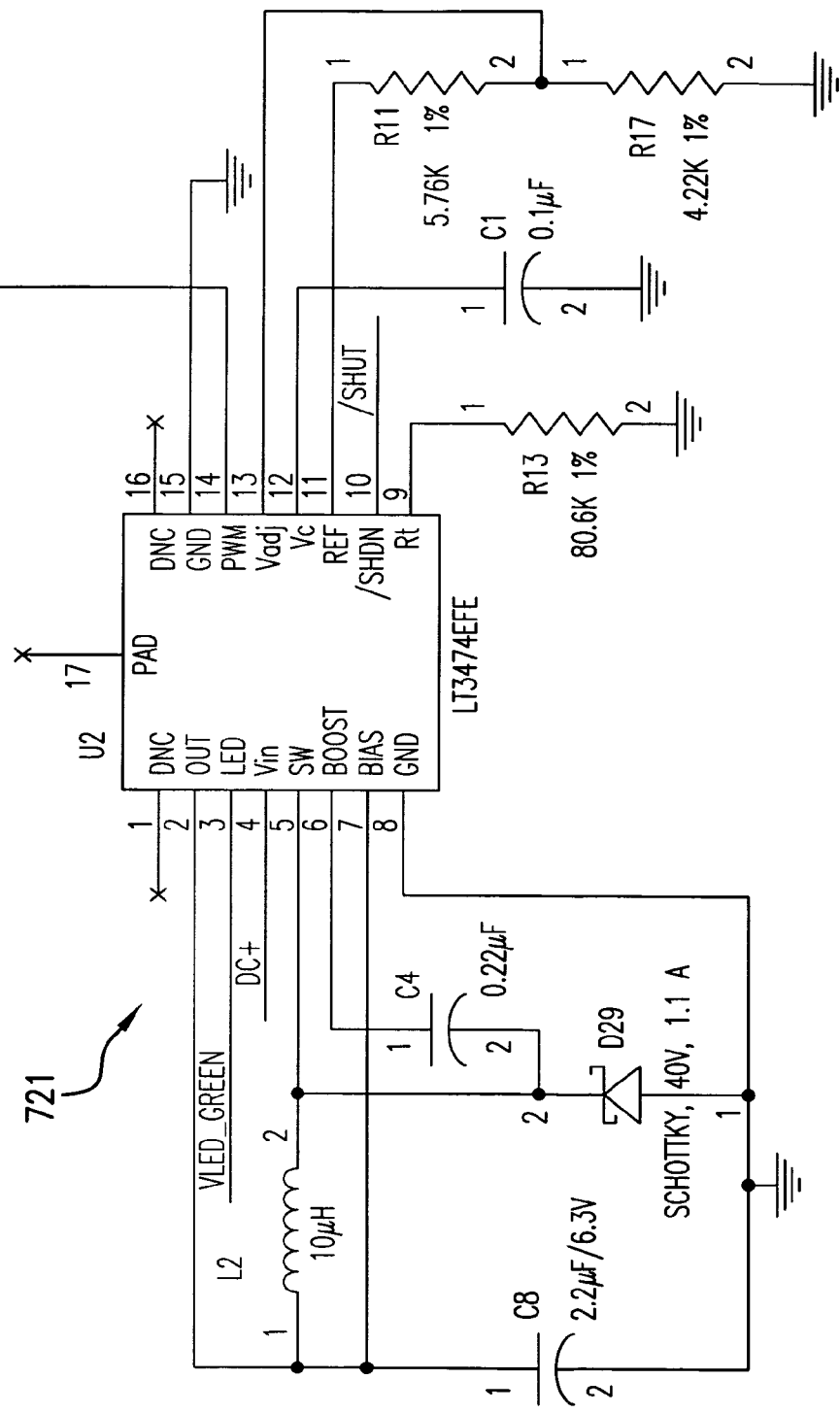
Figures 4, 7:
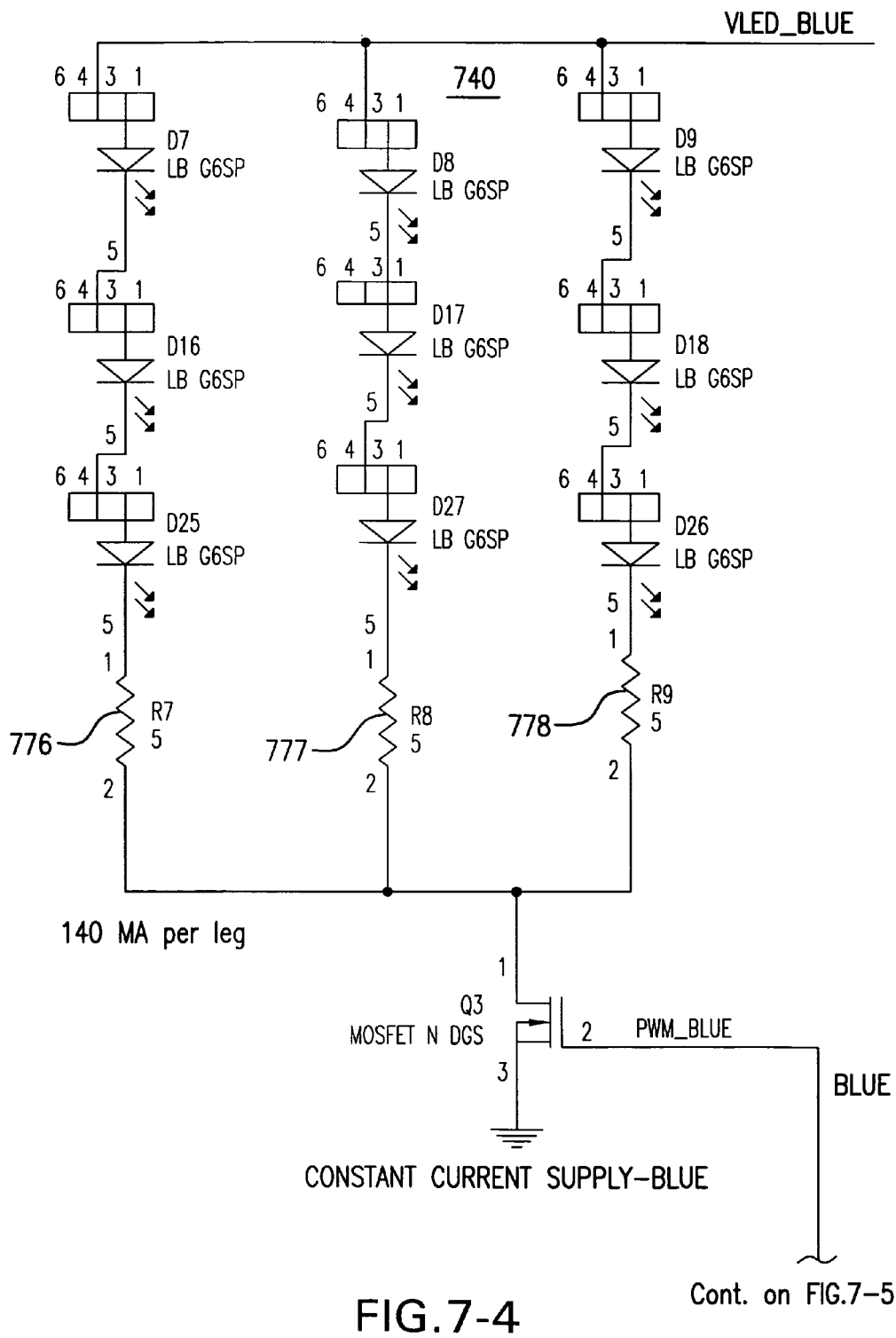
Figures 5, 7:
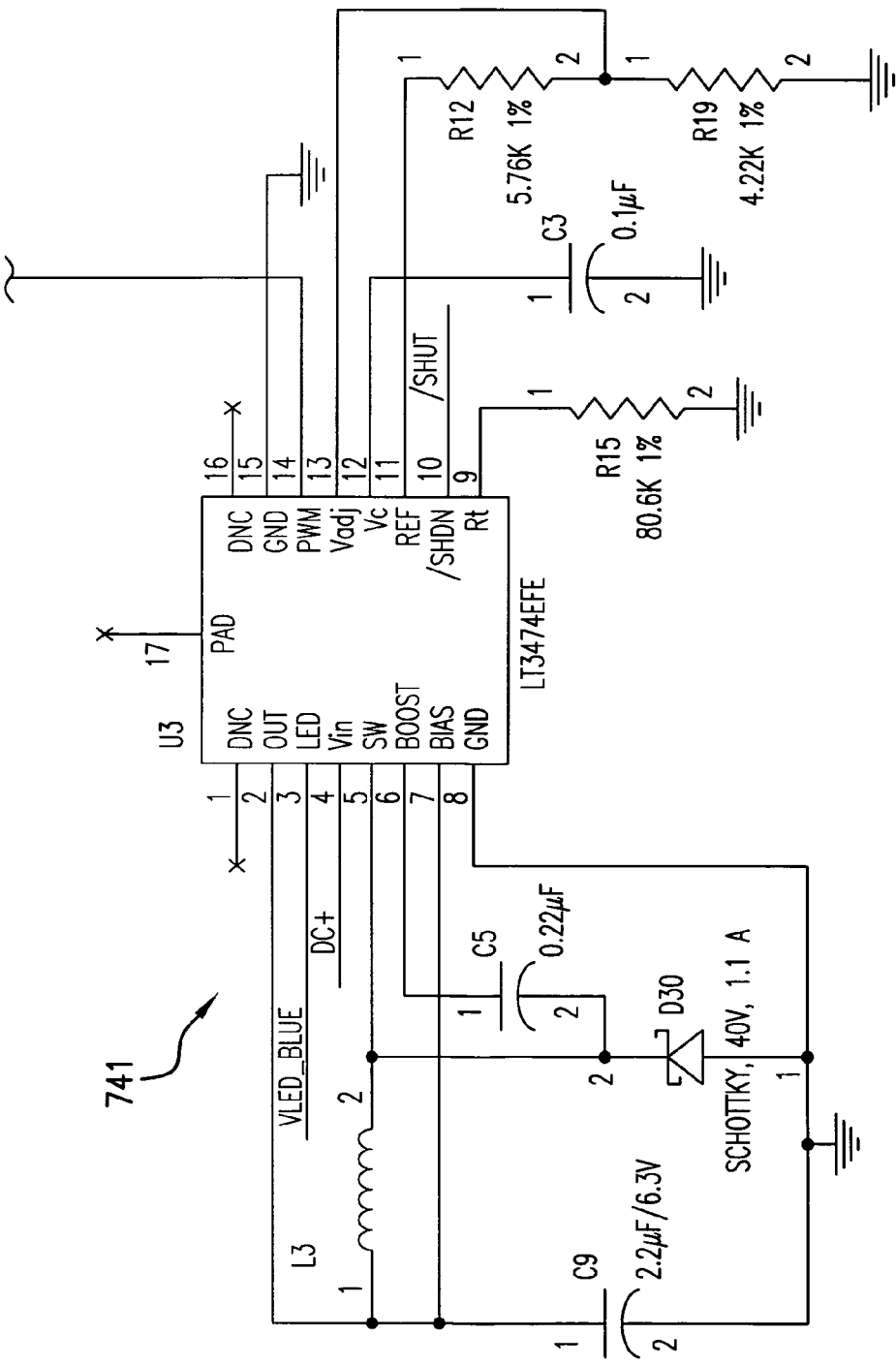
Figures 6, 7:
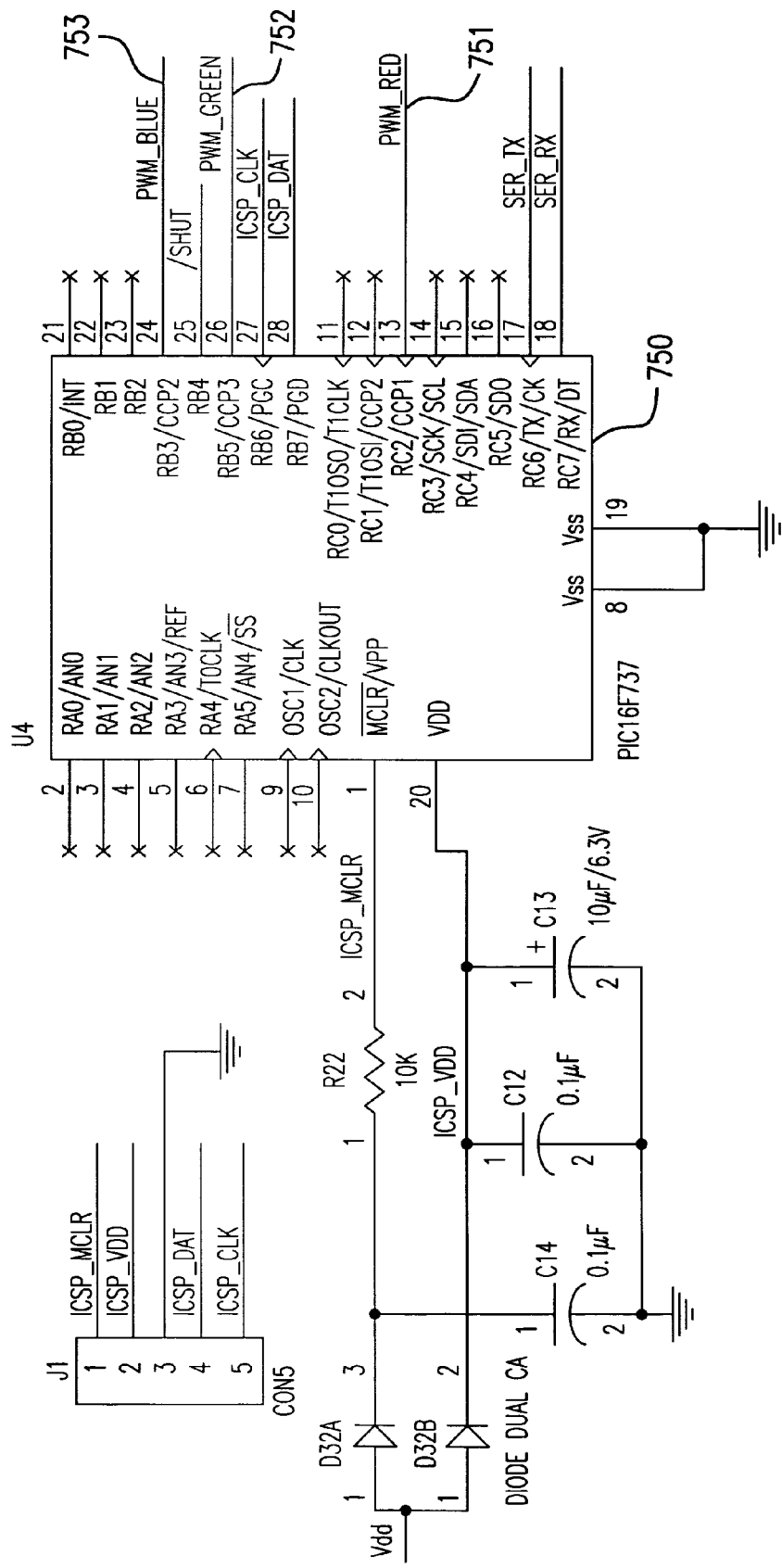
Figure 7:
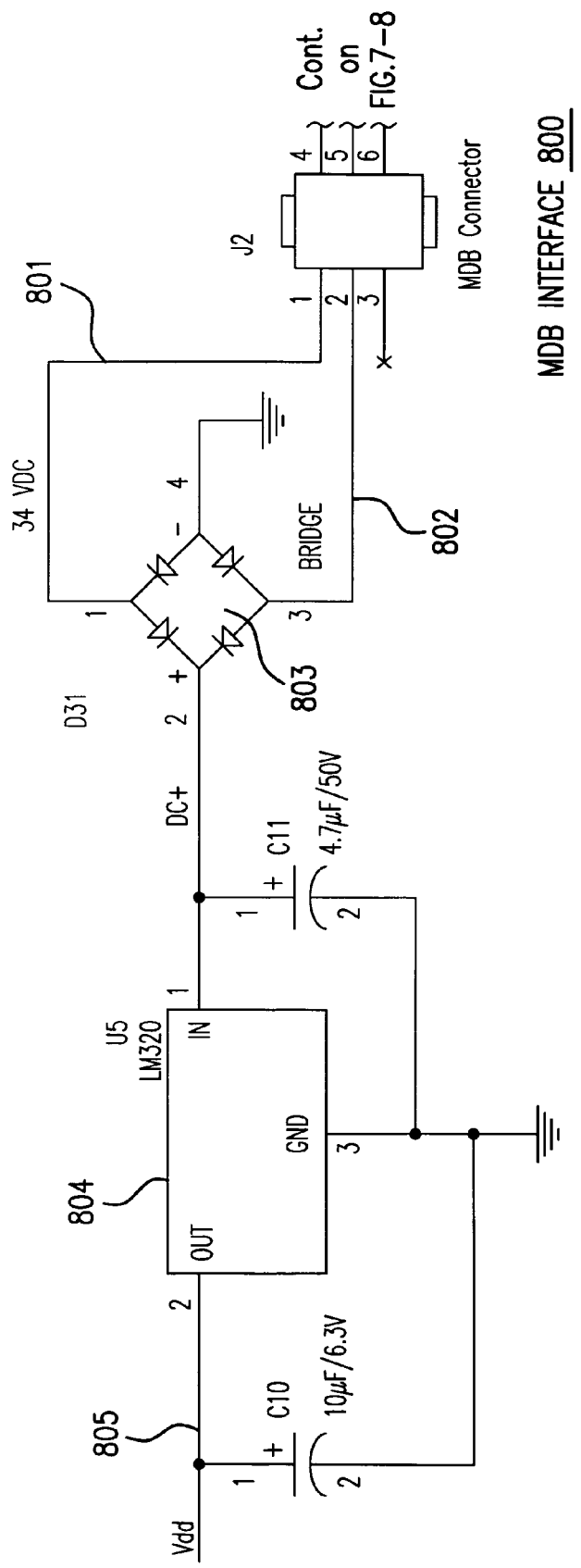

The current invention provides an LED lamp which can be controlled in a number of ways including light intensity and color. The control circuit electronics can be embedded inside the lamp or provided externally through an interface unit, or even implemented in the controller system of the vending machine itself. FIG. 7 shows a preferred electronics schematic for controlling the multicolor LED lamp. Three arrays of color LEDs are used. To achieve full color capability it is well known in the art to use Red, Green and Blue to produce the color spectrum. In addition to production of colored light, various color temperatures of white light may be produced to highlight the colors of products illuminated in the vending machine.

Figures 7, 8:
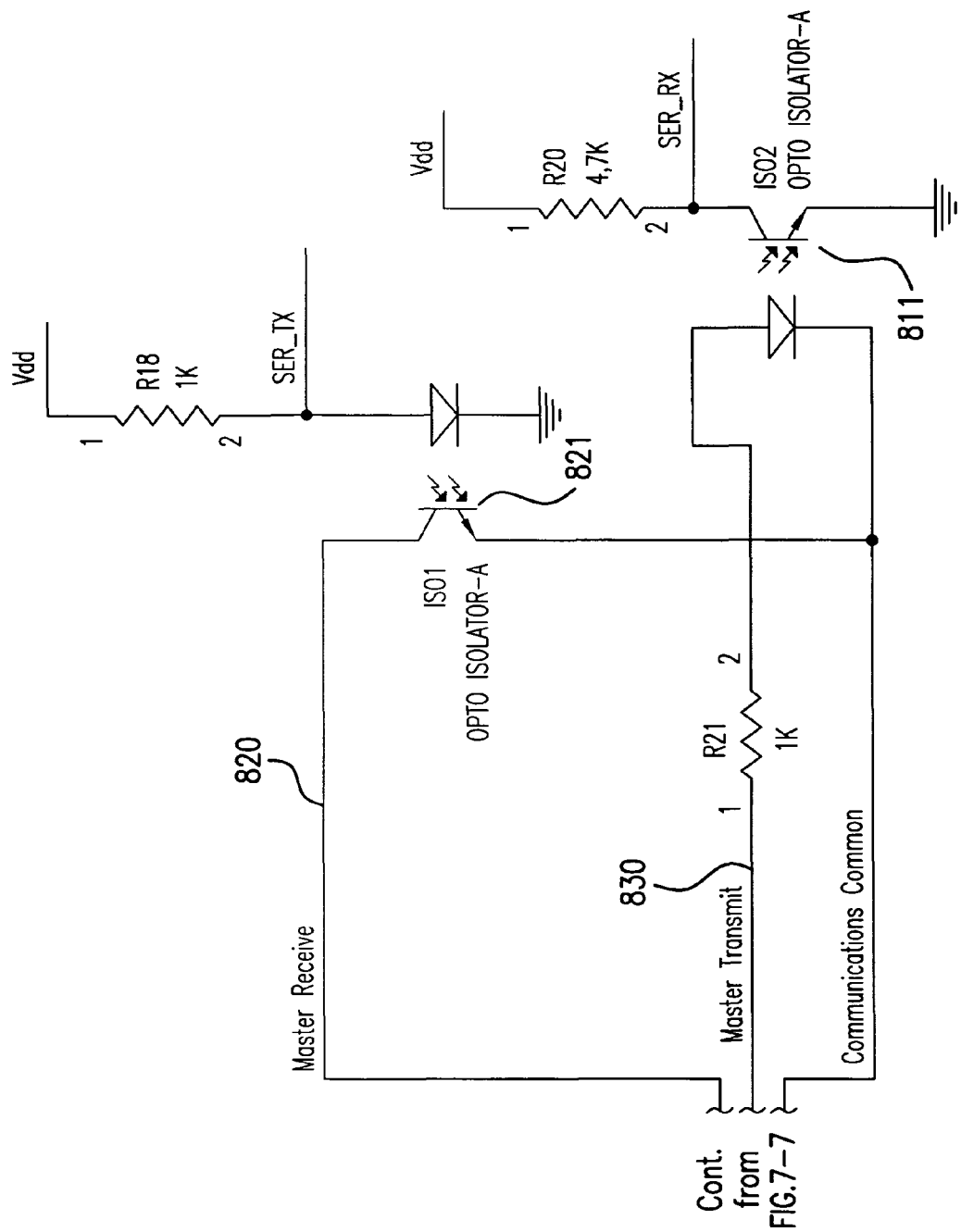
FIG. 8 depicts a chart of typical color LED specifications

In this design, there are three constant current supplies 701, 721 and 741, one for each of the LED color arrays, namely Red 720, Green 730 and Blue 740 respectively. Each of these constant current supplies is independently controlled to allow the proper mix of each of the colors to produce any color required as described below. In order to allow the range of colors that may be desired from an LED "RGB" arrangement, some unique control techniques are required. The emitted wavelength from the chosen LED has to be known and consistent over the range of control required. As specified, the wavelength of a specific LED as determined by its manufacturer is at a specific current level. It is critical to ensure the specified current is used for each LED type chosen for each of the Red, Green and Blue LED arrays. The sample LED data sheet summary shown in FIG. 8 show the characteristics and specifications of each of the Red, Green and Blue LED's used in the preferred embodiment. Additionally, the specifications for an Amber LED are shown. Amber and other colors can be used in addition to or in place of three colors used in the preferred embodiment. Each of these LED specifications indicate the wavelength specified is at a current of 140 mA. The constant current supplies 701, 721, and 741 will each be set for 140 mA per LED string to meet the manufacturer's specifications. An example LED string is shown in FIG. 7 for the Red array 720 as including LED 722, LED 724, and LED 726. Current balancing resistor 770 is also part of this LED string. Depending on the number of such strings controlled by the constant current supply 701, the total current required by the supply can be determined. The circuit shown in 701 is designed to supply up to 1 Amp of current, although the resistor ratio of resistor 707 and resistor 708 anticipates three LED strings with a required current up to 420 mA maximum.

The current to each LED string and to each LED array will be fixed at this designed current so that when the switching supply 701 is conducting, independent of duty cycle, the current supplied is the specified current. This current is supplied to the source voltage on the LED array and is determined by the constant current supply 701 at output VREG RED. The duty cycle therefore determines what percent of the time this fixed current is supplied. The duty cycle is controlled by the Pulse Width Modulation Channel Controller 750 described below. Each of the three color LED arrays is controlled similarly, optimized to ensure the fixed current used is per the manufacturer's specifications independent of the duty cycle.

The details of the control of the current and duty cycle are further described. The constant current switch-mode supplies are similar for each of the three color LED arrays. The following description will be relative to the Red LED array 720 constant current switch-mode supply 701, but applies to each of the other two supplies as well. The constant current switch-mode supply is comprised of a Linear Technologies LT3474 device 702, inductor 703 and diode 704 configured as a conventional switching supply well known in the art and not described in detail here. This circuit is capable of supplying 12 watts of power to an array of LEDs. The device provides precise pulse by pulse current limiting, and also provides an input for PWM modulation. This input cuts off all current to the LED array during the PWM off time. So, when the LEDs are on, they receive their rated optimum operating current. In this design, each series leg of LEDs receives 140 milliamps of current when any current flows. The total current supplied by the constant current switch-mode supply is determined by the resistors 707 and 708.

To control the intensity, a Microchip PIC16F737, 750 microcontroller with three PWM (Pulse Width Modulator) controllers is used. Each of the PWM controllers is delegated to a color, and, by changing the duty cycle of the PWM, the intensity of its corresponding color can be changed. PWM 751 controls the Red LED array 720, PWM 752 controls the Green LED array 730, and PWM 753 controls the Blue LED array 740.

The wavelengths of the LEDs used in the preferred embodiment are shown in FIG. 8. By no means is this device limited to the above wavelengths. By using a longer wavelength blue, for instance 485 nanometers, a higher efficiency Lamp can be made. Amber is given as an alternate to Red, as it can also enhance the efficiency of the Lamp if the deep red color (which the eye is not very sensitive to) is not required, or desired.

Small series resistance, nominally 5 ohms 770 through 778, is used to balance the current in each leg of LED's. This balancing resistor is needed so as to keep a leg of LED's with a low forward voltage from robbing all of the current of a series of LED's with a larger forward voltage. This eliminates having to select LED's with the same forward voltage drops to achieve the current balancing which would add to the cost of the LED's.

The electronic circuit described can be embedded in the LED circuit assembly so that the LED lamp is an integrated "smart" product. Communications to the smart LED lamp can be through any number of generic or industry standard protocols. The LED replacement lamp of the current invention can be used as a replacement for a fluorescent lamp as described above, so long as the means to control the LED replacement lamp is provided. Alternatively, the lamp can be designed to work as a replacement for a fluorescent lamp and its ballast assembly by providing a power source directly to the lamp. This power source can be low voltage such as 24VDC.

Figure 10:
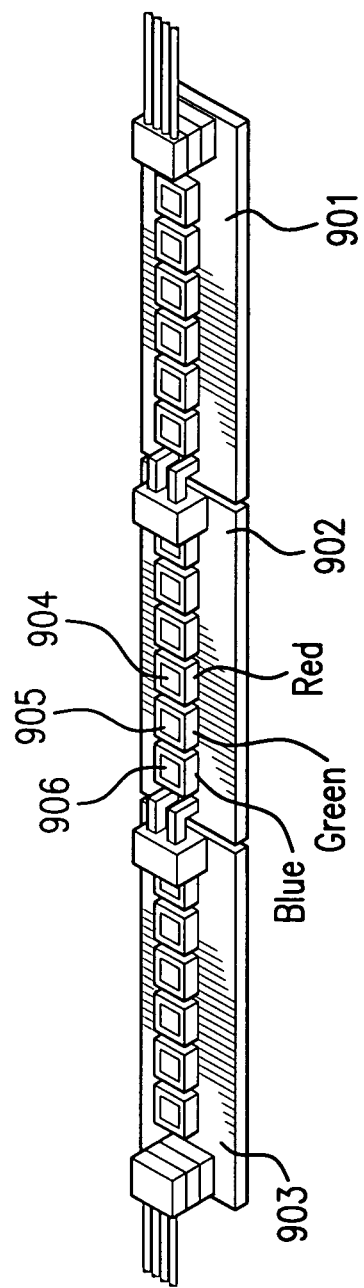
FIG. 10 depicts an alternate configuration of LEDs suitable for use in a fluorescent lamp replacement which has the ability to change colors.

The actual color that will be perceived will be determined by the ratio of light power output from each of the three color LED arrays. The light output of each of the LED arrays is also determined by the manufacture at the rated current. Therefore, the light output from each of the LED arrays can be controlled relative to the other LED arrays by controlling their respective PWM duty cycle. Either a formula or look up table can be used to define the duty cycle relationships between LED arrays to create any specific color output. The arrangement of the LED arrays along with the diffusing lens "mixes" the light outputs to ensure the desired color is produced. FIG. 10 shows a view of three LED array assemblies, 901, 902, and 903 with each assembly having a series of alternating Blue, 906, Green, 905, and Red, 904, LEDs. The configuration of the multicolor LEDs can be in any arrangement suitable to producing overlapping optical fields so they combine to form the desired colors. Alternatively, the LEDs can be multiplexed at high speed to provide the same optical effect although only one LED may be on at a time. This allows for multi die LEDs to be used as well.

The vending industry, by way of example uses an MDB serial interface between peripherals and the vending machine controller. One embodiment of the current invention is a lamp tailored to the vending industry and intended to be controlled by a vending machine controller. The MDB master, or any appropriate serial communication device, can communicate with the Lamp PWM controller through this MDB interface, and change the intensity of each of the three colors, to produce color, change the intensity at a given color (or white) to achieve dimming, create special attention getting effects such as flashing or chasing lights, or control the power to the lamp to turn it off when not required.

The vending industry standard interface, known as MDB is shown schematically in FIG. 7. The interface circuitry 800 provides both power from the MDB interface including an unregulated input voltage, typically 34VDC, 801 and power return, 802. This power is used to power the LED lamp. The 34VDC input relative to the power return is input to a voltage regulator 804 preferably an industry standard part such as the LM320 series regulator supplied by multiple sources. A full wave bridge, 304 is provided although not needed for this interface as the MDB input is already DC voltage. However, the inclusion of the full wave bridge allows low voltage AC to be used if insufficient power is available from the MDB source. A low voltage, 24 VAC supply could be used in place of the DC supply without any adjustments to the circuitry.

The MDB interface includes both transmit, 830, and receive, 820, circuitry to isolate these signals from the source vending controller. Opto isolators 811 and 821 are shown for this purpose. The use of opto isolators for this purpose is fully understood in the art. Of course any suitable serial interface, optical interface, wireless interface, or the like can be used to communicate to the smart LED lamp.

Figure 9:
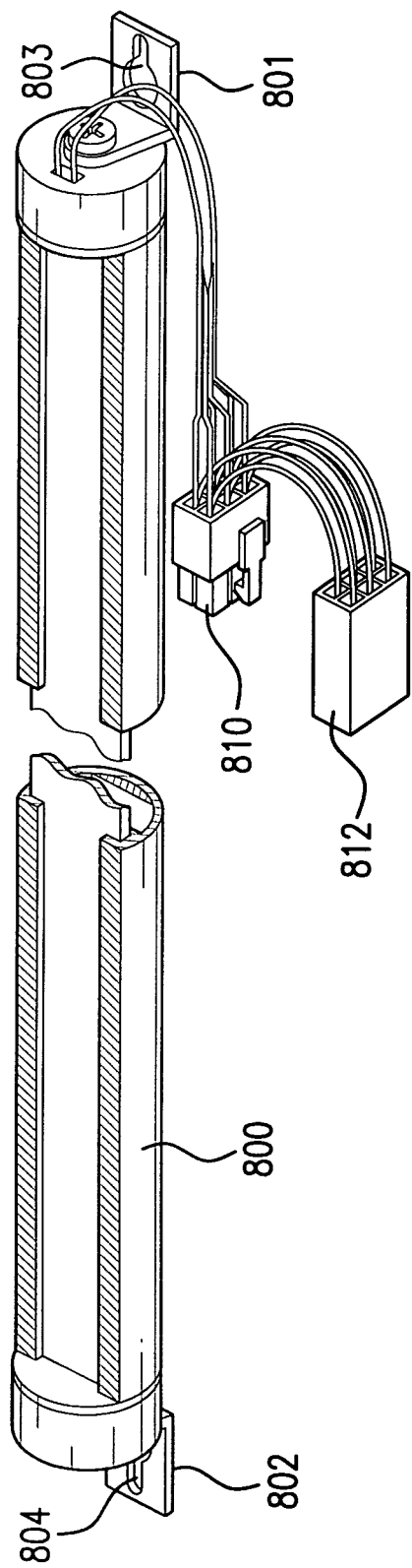
FIG. 9 depicts an LED lamp of the present invention with the vending industry standard MDB connectors.

Referring to FIG. 9, LED lamp assembly, 800, is depicted with mounting brackets 801 and 802 to allow an alternate mounting arrangement to the standard fluorescent socket interface described above. Key hole, 803 and 804 mounting allows the LED lamp to be mounted in either a vertical or horizontal position. The length of the lamp can vary as discussed above using the inter-connecting LED boards. The electronic interface is adapted to the application with the vending standard MDB connector set 810 and 812 shown. This interface is described above. Clearly any type of connector and interface protocol can be used to adapt the current invention to specific industry applications.

Figure 11A:
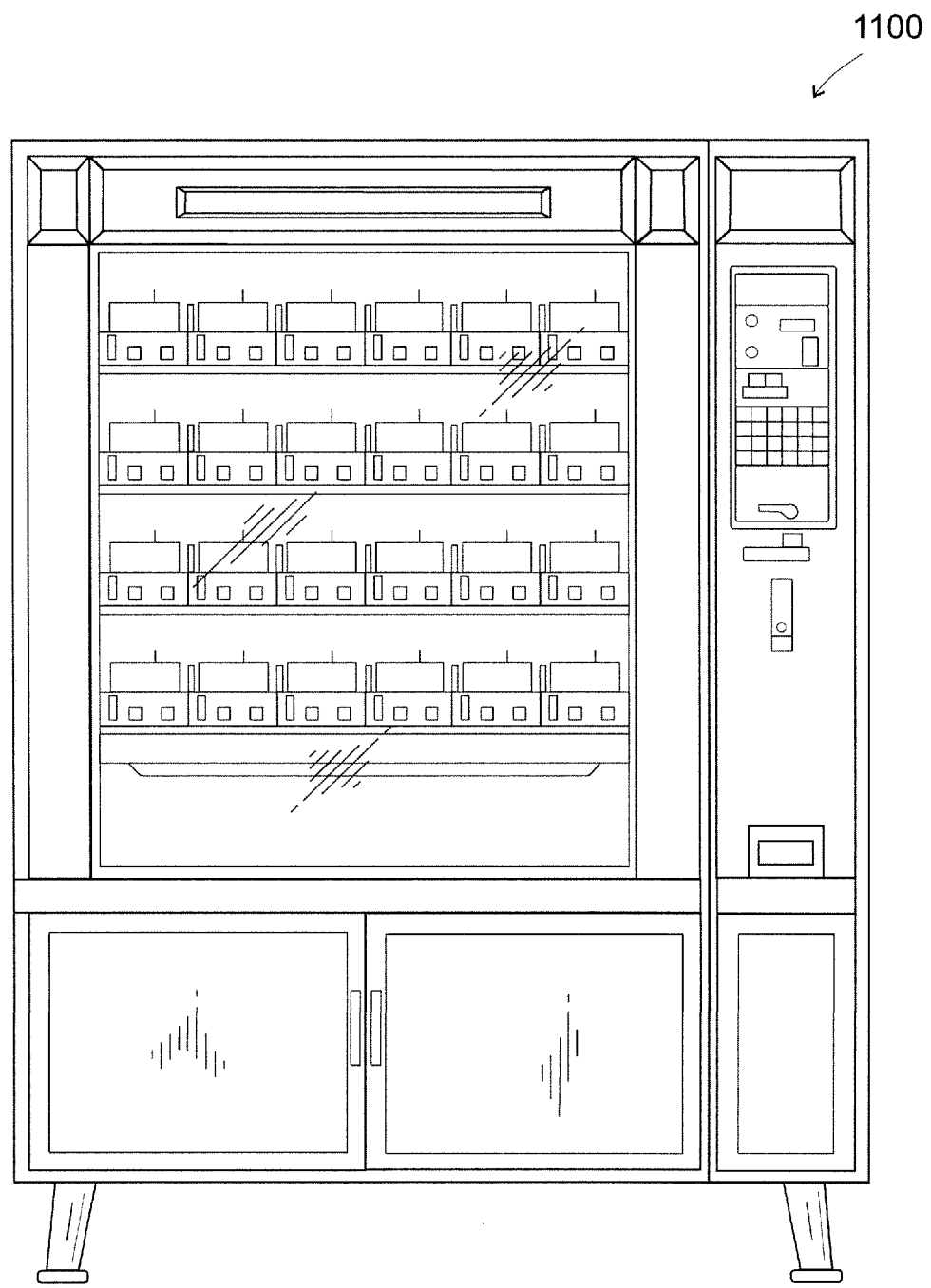
FIGS. 11A and 11B depict a vending machine utilizing the LED based lamp of the present invention.
Figure 11B:
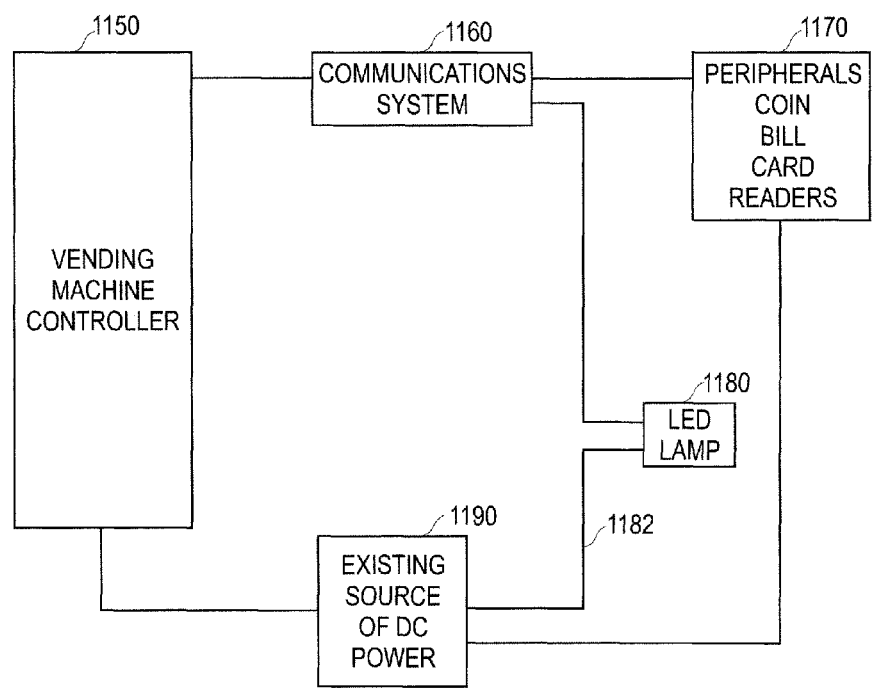

FIGS. 11A and B depict a vending machine 1100 (FIG. 11A) employing a vending controller 1150 (FIG. 11B) mounted inside the vending machine, but shown separately for ease of illustration, to control peripherals 1170, such as coin, bill, and card readers, also mounted internally, but shown externally for ease of illustration, utilizing a communication system 1160 implementing a communication interface, such as the MBD interface, or the like. As seen in FIG. 11B, the vending controller 1150 also communicates with and controls an LED based lamp 1180 in accordance with the present invention as addressed in detail above. Again, the LED based lamp 1180 is mounted internal to the vending machine 1100, but shown in the block diagram of FIG. 11B for ease of illustration. For example, lamp 1180 will typically be mounted above products to be vended by the vending machine 1100. As further seen in FIG. 11B, lamp 1180 has a DC power connector 1182 for connection to an existing source of available DC power 1190 within the vending machine 1100.

While the invention has been described in its preferred embodiments, it is to be understood that the words which have been used are words of description rather than of limitation and that changes may be made within the purview of the appended claims without departing from the true scope and spirit of the invention in its broader aspects. Rather, various modifications may the made in the details within the scope and range of equivalents of the claims and without departing from the spirit of the invention. The inventors further require that the scope accorded their claims be in accordance with the broadest possible construction available under the law as it exists on the date of filing hereof (and of the application from which this application obtains priority) and that no narrowing of the scope of the appended claims be allowed due to subsequent changes in the law, as such a narrowing would constitute an ex post facto adjudication, and a taking without due process or just compensation.

We claim:

1. A vending machine comprising:
   a vending machine controller employing an interface to control peripherals in the vending machine;
   an integrated lamp mounted inside the vending machine and adjustably illuminating products in the vending machine, the integrated lamp comprising:
   a plurality of light emitting diodes within the integrated lamp;
   a DC power connector connected to an existing source of available DC power within the vending machine;
   a power regulating circuit within the integrated lamp connected to the plurality of light emitting diodes, wherein the power regulating circuit is connected to the source of available DC power within the vending machine through the DC power connector, the power regulating circuit adjustably controlling an amount of power provided to the plurality of light emitting diodes; and
   a communications circuit compatible with the interface and receiving vending machine control signals from the vending machine to control adjustment by the power regulating circuit of the illumination provided by the plurality of light emitting diodes based on the vending machine control signals.

2. The vending machine of claim 1 wherein the communications circuit is compatible with at least one of the interfaces selected from the group of interfaces consisting of:
   vending machine serial interfaces, MDB interfaces, vending machine radio frequency interfaces, and vending machine infrared interfaces.

3. The vending machine of claim 1 wherein the power regulating circuit controls the light output of at least some of the plurality of light emitting diodes by controlling a pulse width modulator.

4. The vending machine of claim 1 wherein the power regulating circuit controls the pattern of light emitted by flashing, chasing or dimming at least some of the plurality of light emitting diodes.

5. The vending machine of claim 1 wherein the plurality of light emitting diodes includes groups of light emitting diodes of at least three different colors and the power regulating circuit controls the color output by selectively controlling power provided to each of the groups.

6. The vending machine of claim 1 wherein the vending machine controller controls the operation of the lamp assembly based on time, temperature, sensed presence of potential consumers, or frequency of operation of the vending machine housing the lamp assembly in order to adjustably control the energy consumed.

7. The vending machine of claim 1 wherein the lamp assembly further comprises a physical adjustment mechanism and wherein the direction of light output is changed by utilizing the physical adjustment mechanism of the lamp assembly.

8. The vending machine of claim 7 wherein the physical adjustment mechanism comprises an adjustable positioning wheel at each end of the lamp.

9. The vending machine of claim 1 wherein a first portion of the plurality of light emitting diodes is mounted on a first printed circuit board and a second portion of the plurality of light emitting diodes is mounted on a second printed circuit board.

10. The vending machine of claim 9 further comprising circuit board interconnection means, wherein the first and second printed circuit boards are connectable together to allow a larger and longer lamp to be assembled.

11. The vending machine of claim 1 wherein the DC power connector is connected to 24VDC power supplied by the vending machine.

12. The vending machine of claim 11 wherein the power regulating circuit further comprises one or more pulse width modulator controllers.

13. The vending machine of claim 1 wherein the DC power connector is an MDB serial interface connector.

14. The vending machine of claim 13 wherein the MDB serial interface connector employs both transmit signal and receive signal isolation circuits.

15. The vending machine of claim 13 wherein the DC power connector is connected to 34VDC unregulated power supplied by the MDB serial interface connector.

16. The vending machine of claim 13 wherein said peripherals comprise at least one of a coin reader, a bill reader and a card reader.

\* \* \* \* \*